R. A. Hill,

Branch Stop Cock.

No. 3829. Reissued Feb. 8. 1870.

Attest

R. A. Hill
Inventor
by
D. W. Maxwell
his atty.

N. PETERS, PHOTO-LITHOGRAPHER, WASHINGTON, D. C.

United States Patent Office.

R. A. HILL, FOR HIMSELF, AND H. C. LANE, ASSIGNEE OF R. A. HILL, OF WASHINGTON, DISTRICT OF COLUMBIA.

*Letters Patent No.* 90,541, *dated May* 25, 1869; *reissue No.* 3,829, *dated February* 8, 1870.

IMPROVEMENT IN BRANCH STOP-COCKS FOR MAINS.

The Schedule referred to in these Letters Patent and making part of the same.

*To all whom it may concern:*

Be it known that I, R. A. HILL, of the city and county of Washington, in the District of Columbia, have invented a certain Improvement in Branch Stop-Cocks for Mains; and I do hereby declare that the following is a full, clear, and exact description thereof, reference being had to the annexed drawings making part of this specification, in which—

Figure 1:
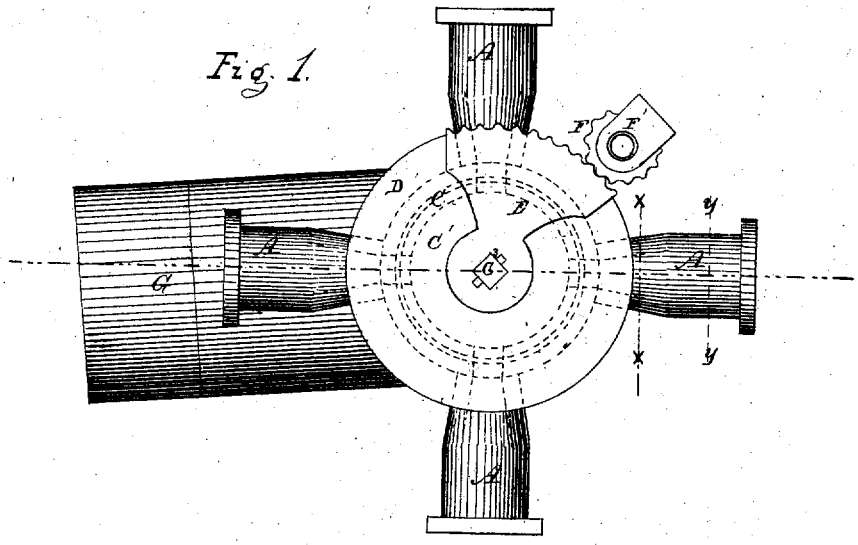
Figure 1 is a plan view.
Figure 3:
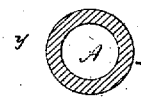
Figure 3 is a section on the line *y y* of fig. 1.
Figure 4:
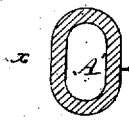
Figure 4 is a section on the line *x x* of fig. 1.
Figure 2:
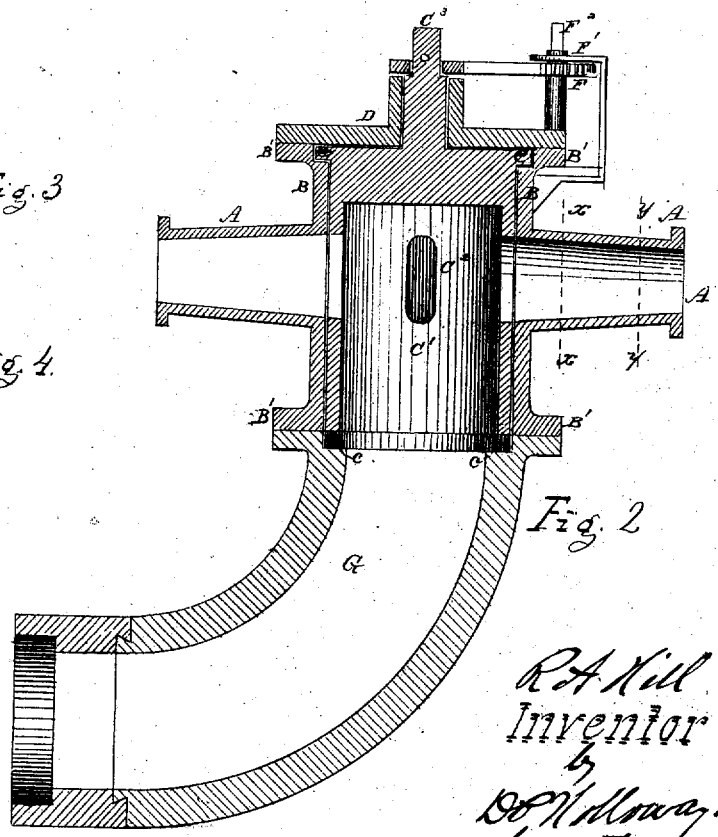
Figure 2 is a vertical section.

The same letters are used in all the figures to indicate indentical parts.

My invention relates to a stop-cock for receiving water from both mains at a crossing, and connecting the four converging pipes to convey the water to the fire-plugs through a branch pipe, having capacity to issue all the water received from all the pipes; and My improvements consist in first, the form of the induction-pipe, by which the size of the receiving-cylinder is reduced; secondly, in the use of a stop-cock, by which the water from the four converging pipes is carried into a lateral branch pipe placed below the mains, and of sufficient capacity to convey all the water passing through the four pipes to the fire-plugs; and also in certain peculiarities of construction to be hereinafter specifically indicated in the following specification and claims.

Lateral branch pipes for carrying water to the fire-plugs from street-mains have heretofore opened out of one of the mains only, so that in case where two or more engines have been attached to different parts of the same main, there has been found to be a deficient supply of water, where the mains were small and inadequate to supply them all. Another disadvantage arising from this arrangement has been that the fire-engines had to be distributed, some of them at a considerable distance from the fire, requiring a large supply of hose, and impairing the efficiency of the engines and increasing the time necessary for getting them into operation.

I desire to provide means for supplying a number of engines from one set of plugs, placed at the pavement at the corner nearest the fire.

I have shown in my Letters Patent No. 90,540, bearing date May 25, A. D. 1869, an arrangement for six sets of fire-plugs, which arrangement may be modified to increase or diminish the number, according to the requirements of the town or city.

It is obvious that it would be impossible to supply such a number of plugs with water drawn in the ordinary manner from a single main, except in cases where very large mains were tapped for the purpose.

I am aware, however, that fire-plugs have been placed over the intersection of the mains in the centre of the street, supplied with water drawn from both mains; but these have been subject to the disadvantage that they had to be placed below the level of the street, for if raised above the level of the street they would interfere with the ordinary use of the street.

The peculiarity in the arrangement of my stop-cock and branch-pipe is that I draw out the water below the level of the mains, and carry it in a lateral pipe of a diameter sufficient to convey the water drawn from all the mains, and below the frost-line, to fire-plugs placed at the edge of the street, and out of the way of the travel on the street.

In the annexed drawings, I have shown four branch pipes, A A &c., connected by flanges with the four converging pipes of the mains. These four branch pipes are cast with the cylinder B, constructed with flanges B′, above and below, to connect it with the cap D and eduction-pipe G.

The cylinder is bored out through its entire length to receive the stop-cock C, and having recesses at the upper and lower ends to receive the flange *c*, to be hereinafter described.

The stop-cock C is turned off to fit the inner bore of the cylinder B, within which it revolves. It is formed with a chamber, $C^1$, having four elongated openings, $C^2$, to receive the water entering from the branch pipes A. These pipes are round where they receive the water from the mains, but flattened so as to be extended in diameter vertically, without diminishing the area of the discharge at that part of the pipe where it is connected with the cylinder. This flattened form of the inlet openings is important, for in proportion as the diameter is reduced may the diameter of the cylinder B be reduced.

In order that the openings C may register with the openings of the branch pipes, and be turned when necessary against the blank surfaces of the cylinder to shut off the water, it is necessary that the circumference of the latter shall be more than eight times that of the horizontal diameter of the induction-pipes. It is obvious, then, that an important object is gained by reducing the horizontal diameter of the induction-openings, as thereby the diameter of the cylinder is proportionately reduced.

The stop-cock C has upon its upper and lower edges flanges, *c*, fitting neatly into the corresponding chamfers in the cylinder B. The object of these flanges is to hold the stop-cock in place, and resist the pressure of the water tending to lift it in its seat.

A stem, $C^3$, attached to the top of the stop-cock, is designed to project through the cap D, to receive a lever used for opening or closing the stop-cock. This cap is bolted to the upper flange B′, and fits neatly about the stem $C^3$, passing through a stuffing-box.

The stop-cock is conveniently operated by the lever

E, having on its outer end a segmental rack meshing into the pinion F, which revolves with the shaft $F^2$, in bearings upon a frame, $F^1$, bolted to the cylinder.

The shaft $F^2$ may be squared upon the upper end to receive a socket, wrench, or crank, by which it may be turned to open or close the stop-cock.

When the openings, $C^2$, register with the openings A′ of the branch pipes, the water will flow from the four pipes into the chamber $C^1$, and pass thence downward through the eduction-pipe G, which is bolted by flanges to the bottom of the cylinder B.

The diameter of this eduction-pipe should be such that it will issue all the water passing through the four-branch pipes A. This will be effected by making the diameter of the eduction-pipe double that of each of the mains.

In the use of this device, the water flows uninterruptedly through both the mains, while the lateral pipe G is constantly filled with water ready to supply the fire-plugs. It is, therefore, not necessary to operate the stop-cock on the mains in case of fire, nor at any time except when it is desired to shut off the water from the mains or from the pipe G. By this means, if repairs are necessary to the fire-plugs, the water may be shut off from them by turning the stop-cock C, and without affecting the supply of water to persons on the adjoining squares.

If the pipes require to be opened on a square by turning off the stop-cocks at two corners, the water will only be shut off from the one square.

What I claim as my invention, and desire to secure by Letters Patent, is—

1. In combination with the four converging pipes of two cross-mains, a cylinder and stop-cock for receiving the water simultaneously from the four main pipes, and discharging it below the mains into the large eduction-pipe G, and for shutting it off, substantially as set forth.

2. In combination with the cylinder B and stop-cock C and four branch pipes, the vertically elongated induction passages $C^2$ and A′, substantially as and for the purpose set forth.

3. The stop-cock and cylinder, in combination, when respectively constructed with a flange or flanges, *c*, and corresponding recesses to confine the stop-cock, substantially as set forth.

4. The combination of the four pipes, cylinder, and stop-cock, and stem $C^3$, lever E, having a segmental rack and pinion F, for operating the stop-cock in letting on or shutting off the water, with the eduction-pipe G, substantially as set forth.

5. The arrangement of the eduction-pipe G, to carry off the water flowing through the mains below the level of the branch, substantially as set forth.

In testimony whereof, I have signed my name to this specification before two subscribing witnesses.

R. A. HILL.

Witnesses:

J. MOODY SMITH,

C. T. NUTZE.